US012185085B2

(12) United States Patent
Koppens et al.

(10) Patent No.: US 12,185,085 B2
(45) Date of Patent: Dec. 31, 2024

(54) APPARATUS AND METHOD FOR GENERATING A DIFFUSE REVERBERATION SIGNAL

(71) Applicant: KONINKLIJKE PHILIPS N.V., Eindhoven (NL)

(72) Inventors: Jeroen Gerardus Henricus Koppens, Nederweert (NL); Patrick Kechichian, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 90 days.

(21) Appl. No.: 17/928,319

(22) PCT Filed: Jun. 21, 2021

(86) PCT No.: PCT/EP2021/066763
§ 371 (c)(1),
(2) Date: Nov. 29, 2022

(87) PCT Pub. No.: WO2021/259829
PCT Pub. Date: Dec. 30, 2021

(65) Prior Publication Data
US 2023/0209302 A1 Jun. 29, 2023

(30) Foreign Application Priority Data
Jun. 22, 2020 (EP) .................................... 20181351

(51) Int. Cl.
*H04R 5/00* (2006.01)
*H04S 1/00* (2006.01)
*H04S 7/00* (2006.01)

(52) U.S. Cl.
CPC .............. *H04S 7/307* (2013.01); *H04S 1/007* (2013.01); *H04S 2400/03* (2013.01)

(58) Field of Classification Search
CPC ................................ H04S 7/307; H04S 1/007
See application file for complete search history.

(56) References Cited

U.S. PATENT DOCUMENTS

2016/0345116 A1* 11/2016 Yen .......................... H04S 7/30
2019/0373398 A1* 12/2019 Breebaart .............. H04S 3/008
(Continued)

FOREIGN PATENT DOCUMENTS

EP 340222 A1 11/2018
EP 3402222 A1 * 11/2018 ............ G10K 15/12
EP 3595337 A1 1/2020

OTHER PUBLICATIONS

MPEG-1 6DoF Audio Encoder Input Format: 129 Mpeg Meeting Jan. 17, 2002.
(Continued)

*Primary Examiner* — Simon King

(57) ABSTRACT

An audio apparatus for generating a diffuse reverberation signal comprises a receiver (501) receiving audio signals representing sound sources and metadata comprising a diffuse reverberation signal to total source relationship indicative of a level of diffuse reverberation sound relative to total emitted sound in the environment. The metadata also for each audio signal comprises a signal level indication and a directivity data indicative of directivity of sound radiation from the sound source represented by the audio signal. A circuit (505, 507) determines a total emitted energy indication based on the signal level indication and the directivity data, and a downmix coefficient based on the total emitted energy and the diffuse reverberation signal to total signal relationship. A downmixer (509) generates a downmix signal by combining signal components for each audio signal generated by applying the downmix coefficient for each audio signal to the audio signal. A reverberator (407) gen-
(Continued)

erates the diffuse reverberation signal for the environment from the downmix signal component.

21 Claims, 7 Drawing Sheets

(56) References Cited

U.S. PATENT DOCUMENTS

| | | | | |
|---|---|---|---|---|
| 2020/0227052 | A1* | 7/2020 | Breebaart | H04S 1/007 |
| 2021/0051435 | A1* | 2/2021 | Yen | H04S 7/306 |

OTHER PUBLICATIONS

Herre et al "Proposed Updates On MPEG-I 6DOF Audio Encoder Input Format" MPEG Meeting Oct. 2, 2019.

International Search Report and Written Opinion from PCT/EP2021/066763 mailed Sep. 2, 2021.

Section 3.9 of MPEG output document N19211, "MPEG-I 6DoF Audio Encoder Input Format", MPEG 130.

Jean-Marc Jot and Antoine Chaigne, "Digital delay networks for designing artificial reverberators", 90th AES Convention, 1991.

Jean-Marc Jot, "An analysis/synthesis approach to real-time artificial reverberation", Proc. ICASSP-92, 1992, vol. 2, pp. 221-224.

Fritz Menzer and Christof Faller, "Binaural reverberation using a modified Jot reverberator with frequency dependent interaural coherence matching", 126th AES Convention Munich, May 2009.

https://reuk.github.io/wayverb/image_source.html downloaded Oct. 11, 2022.

Stephen G. McGovern, Fast image method for impulse response calculations of box-shaped rooms, Applied Acoustics 70 (2009) 182-189.

https://en.wikipedia.org/wiki/Critical_distance downloaded Oct. 11, 2022.

* cited by examiner

APPARATUS AND METHOD FOR GENERATING A DIFFUSE REVERBERATION SIGNAL

CROSS-REFERENCE TO PRIOR APPLICATIONS

This application is the U.S. National Phase application under 35 U.S.C. § 371 of International Application No. PCT/EP2021/066763, filed on Jun. 21, 2021, which claims the benefit of EP Patent Application No. EP 20181351.6, filed on Jun. 22, 2020. These applications are hereby incorporated by reference herein.

FIELD OF THE INVENTION

The invention relates to an apparatus and method processing audio data, and in particular, but not exclusively, for processing to generate diffuse reverberation signals for augmented/mixed/virtual reality applications.

BACKGROUND OF THE INVENTION

The variety and range of experiences based on audiovisual content have increased substantially in recent years with new services and ways of utilizing and consuming such content continuously being developed and introduced. In particular, many spatial and interactive services, applications and experiences are being developed to give users a more involved and immersive experience.

Examples of such applications are Virtual Reality (VR), Augmented Reality (AR), and Mixed Reality (MR) applications, which are rapidly becoming mainstream, with a number of solutions being aimed at the consumer market. A number of standards are also under development by a number of standardization bodies. Such standardization activities are actively developing standards for the various aspects of VR/AR/MR systems including e.g. streaming, broadcasting, rendering, etc.

VR applications tend to provide user experiences corresponding to the user being in a different world/environment/scene whereas AR (including Mixed Reality MR) applications tend to provide user experiences corresponding to the user being in the current environment but with additional information or virtual objects or information being added. Thus, VR applications tend to provide a fully immersive synthetically generated world/scene whereas AR applications tend to provide a partially synthetic world/scene which is overlaid the real scene in which the user is physically present. However, the terms are often used interchangeably and have a high degree of overlap. In the following, the term Virtual Reality/VR will be used to denote both Virtual Reality and Augmented/Mixed Reality.

As an example, a service being increasingly popular is the provision of images and audio in such a way that a user is able to actively and dynamically interact with the system to change parameters of the rendering such that this will adapt to movement and changes in the user's position and orientation. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image, typically presented using a stereoscopic display. Indeed, in order to optimize immersion of the viewer, it is typically preferred for the user to experience the presented scene as a three-dimensional scene. Indeed, a virtual reality experience should preferably allow a user to select his/her own position, viewpoint, and moment in time relative to a virtual world.

In addition to the visual rendering, most VR/AR applications further provide a corresponding audio experience. In many applications, the audio preferably provides a spatial audio experience where audio sources are perceived to arrive from positions that correspond to the positions of the corresponding objects in the visual scene. Thus, the audio and video scenes are preferably perceived to be consistent and with both providing a full spatial experience.

For example, many immersive experiences are provided by a virtual audio scene being generated by headphone reproduction using binaural audio rendering technology. In many scenarios, such headphone reproduction may be based on headtracking such that the rendering can be made responsive to the user's head movements, which highly increases the sense of immersion.

An important feature for many applications is that of how to generate and/or distribute audio that can provide a natural and realistic perception of the audio environment. For example, when generating audio for a virtual reality application it is important that not only are the desired audio sources generated but these are also modified to provide a realistic perception of the audio environment including damping, reflection, coloration etc.

For room acoustics, or more generally environment acoustics, reflections of sound waves off walls, floor, ceiling, objects etc. of an environment cause delayed and attenuated (typically frequency dependent) versions of the sound source signal to reach the listener (i.e. the user for a VR/AR system) via different paths. The combined effect can be modelled by an impulse response which may be referred to as a Room Impulse Response (RIR) hereafter (although the term suggests a specific use for an acoustic environment in the form of a room it tends to be used more generally with respect to an acoustic environment whether this corresponds to a room or not).

As illustrated in FIG. 1, a room impulse response typically consists of a direct sound that depends on distance of the sound source to the listener, followed by a reverberant portion that characterizes the acoustic properties of the room. The size and shape of the room, the position of the sound source and listener in the room and the reflective properties of the room's surfaces all play a role in the characteristics of this reverberant portion.

The reverberant portion can be broken down into two temporal regions, usually overlapping. The first region contains so-called early reflections, which represent isolated reflections of the sound source on walls or obstacles inside the room prior to reaching the listener. As the time lag increases, the number of reflections present in a fixed time interval increases and the paths may include secondary or higher order reflections (e.g. reflections may be off several walls or both walls and ceiling etc).

The second region in the reverberant portion is the part where the density of these reflections increases to a point that they cannot be isolated by the human brain anymore. This region is typically called the diffuse reverberation, late reverberation, or reverberation tail.

The reverberant portion contains cues that give the auditory system information about the distance of the source, and size and acoustical properties of the room. The energy of the reverberant portion in relation to that of the anechoic portion largely determines the perceived distance of the sound source. The level and delay of the earliest reflections may provide cues about how close the sound source is to a wall, and the filtering by anthropometrics may strengthen the assessment of the specific wall, floor or ceiling.

The density of the (early-) reflections contributes to the perceived size of the room. The time that it takes for the reflections to drop 60 dB in energy level, indicated by the reverberation time $T_{60}$, is a frequently used measure for how fast reflections dissipate in the room. The reverberation time provides information on the acoustical properties of the room: such as specifically whether the walls are very reflective (e.g. bathroom) or there is much absorption of sound (e.g. bedroom with furniture, carpet and curtains).

Furthermore, RIRs may be dependent on a user's anthropometric properties when it is a part of a binaural room impulse response (BRIR), due to the RIR being filtered by the head, cars and shoulders: i.e. the head related impulse responses (HRIRs).

As the reflections in the late reverberation cannot be differentiated and isolated by a listener, they are often simulated and represented parametrically with, e.g., a parametric reverberator using a feedback delay network, as in the well-known Jot reverberator.

For early reflections, the direction of incidence and distance dependent delays are important cues to humans to extract information about the room and the relative position of the sound source. Therefore, the simulation of early reflections must be more explicit than the late reverberation. In efficient acoustic rendering algorithms, the early reflections are therefore simulated differently from the later reverberation. A well-known method for early reflections is to mirror the sound sources in each of the room's boundaries to generate a virtual sound source that represents the reflection.

For early reflections, the position of the user and/or sound source with respect to the boundaries (walls, ceiling, floor) of a room is relevant, while for the late reverberation, the acoustic response of the room is diffuse and therefore tends to be more homogeneous throughout the room. This allows simulation of late reverberation to often be more computationally efficient than early reflections.

Two main properties of the late reverberation that are defined by the room are the T60 value and the reverb level. In terms of the diffuse reverberation impulse response, these values represent the slope and the amplitude of the impulse response. Both are typically strongly frequency dependent in natural rooms.

The T60 parameter is important to provide an impression of the reflectiveness and size of the room, while the reverberation level is indicative of the compound effect of multiple reflections on the room's boundaries. The reverb level and its frequency behavior is dependent on the pre-delay, indicating where the distinction between early reflections and late reverb is made (see FIG. 2).

The reverberation level has its main psycho-acoustic relevance in relation to the direct sound. The level difference between the two are an indication of the distance between the sound source and the user (or RIR measurement point). A larger distance will cause more attenuation on the direct sound, while the level of the late reverb stays the same (it is the same in the entire room). Similarly, for sources with directivity dependent on where the user is with respect to the source, the directivity influences the direct response as the user moves around the source, but not the level of the reverberation.

An important challenge and consideration for many systems, such as virtual reality applications, is that of how to efficiently represent and distribute the audio environment. Often the audio for an environment is represented and distributed by providing signals representing the individual source signals together with data that may parametrically describe properties of the audio source and the acoustic environment. This challenge is far from a trivial issue and a range of issues may be considered.

It has been proposed to separate descriptions of the direct paths and the diffuse reverberation. However, the issue of how to represent, distribute, and render/synthesize the diffuse reverberation is currently receiving significant interest.

It has been proposed to provide an indication of the reverberation level which is not in relation to the direct sound, but rather by a more generic property. A specific proposal has been put as part of the preparations for the MPEG-I Audio Call for Proposals (CfP) where an Encoder Input Format (EIF) has been defined (section 3.9 of MPEG output document N19211, "MPEG-I 6DoF Audio Encoder Input Format", MPEG 130). The EIF defines the reverberation level by a pre-delay and Direct-to-Diffuse Ratio (DDR). The DDR is defined as the ratio between diffuse reverberation energy and emitted source energy after pre-delay:

$$DDR = \frac{\text{total diffuse reverb energy}}{\text{total emitted energy}}$$

However, whereas such a parameter may be useful, there are many substantial issues that need to be addressed. For example, there is currently no proposal for how the specific parameters should be defined or determined. Neither is there any consideration of how a DDR indication can be used to render audio and specifically how it can be used to generate diffuse reverberation signals.

EP3402222 discloses virtualization methods for generating a binaural signal in response to channels of a multichannel audio signal, which apply a binaural room impulse response (BRIR) to each channel including by using at least one feedback delay network (FDN) to apply a common late reverberation to a downmix of the channels.

Thus, current approaches and proposals for how to represent and generate audio and specifically diffuse reverberation tends to be suboptimal or insufficient and/or incomplete. This is particularly the case for e.g. virtual reality applications where the position for which audio should be generated may change substantially.

Hence, an approach for generating diffuse reverberation signals would be advantageous. In particular, an approach that allows improved operation, increased flexibility, reduced complexity, facilitated implementation, an improved audio experience, improved audio quality, reduced computational burden, improved suitability for varying positions, improved performance for virtual/mixed/augmented reality applications, improved perceptual cues for diffuse reverberation, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an audio apparatus for generating a diffuse reverberation signal for an environment: the apparatus comprising: a receiver arranged to receive a plurality of audio signals representing sound sources in the environment: a metadata receiver arranged to receive metadata for the plurality of audio signals, the metadata comprising: a diffuse reverberation signal to total signal relationship indicative of a level of diffuse reverberation sound relative to total emitted sound in the environment, and for each audio signal: a signal level indication: directivity data indicative of directivity of sound radiation from the sound source represented by the audio signal: a circuit arranged to, for each of the plurality of audio signals, determine: a total emitted energy indication based on the signal level indication and the directivity data, and a downmix coefficient based on the total emitted energy and the diffuse reverberation signal to total signal relationship: a downmixer arranged to generate a downmix signal by combining signal components for each audio signal generated by applying the downmix coefficient for each audio signal to the audio signal: a reverberator for generating the diffuse reverberation signal for the environment from the downmix signal component.

The invention may provide improved and/or facilitated determination of a diffuse reverberation signal in many embodiments. The invention may in many embodiments and scenarios generate a more naturally sounding diffuse reverberation signal providing an improved perception of the acoustic environment. The generation of the diffuse reverberation signal may often be generated with low complexity and low computational resource requirements. The approach allows for the diffuse reverberation sound in an acoustic environment to be represented effectively by relatively few parameters which also provide an efficient representation of individual sources and individual path sound propagation from these, and specifically for a direct path propagation.

The approach may in many embodiments allow a diffuse reverberation signal to be generated independently of source and/or listener positions. This may allow efficient generation of diffuse reverberation signals for dynamic applications where positions change, such as for many virtual reality and augmented reality applications.

The diffuse reverberation signal to total signal ratio may also be referred to as the diffuse reverberation signal level to total signal level ratio or the diffuse reverberation level to total level ratio or emitted source energy to the diffuse reverberation energy ratio (or variations/permutations thereof).

The audio apparatus may be implemented in a single device or a single functional unit or may be distributed across different devices or functionalities. For example, the audio apparatus may be implemented as part of a decoder functional unit or may be distributed with some functional elements being performed at a decoder side and other elements being performed at the encoder side.

According to an optional feature of the invention, the directivity of sound radiation is frequency dependent and the circuit is arranged to generate a frequency dependent total emitted energy and frequency dependent downmix coefficients.

The approach may provide a particularly efficient operation for generating diffuse reverberation signals reflecting frequency dependencies.

According to an optional feature of the invention, the diffuse reverberation signal to total signal relationship is frequency dependent and the circuit is arranged to generate frequency dependent downmix coefficients.

The approach may provide a particularly efficient operation for generating frequency dependent diffuse reverberation signals reflecting frequency dependencies.

According to an optional feature of the invention, the diffuse reverberation signal to total signal relationship comprises a frequency dependent part and a non-frequency dependent part, and wherein the circuit is arranged to generate the downmix coefficients in dependence on the non-frequency dependent part and to adapt the reverberator in dependence on the frequency dependent part.

The approach may provide a particularly efficient operation for generating diffuse reverberation signals reflecting frequency dependencies, and may specifically reduce complexity and/or resource usage. For example, the approach may allow the frequency dependency to be reflected by a single filtering of the downmix signal.

According to an optional feature of the invention, the circuit is arranged to determine the total emitted energy indication for a first audio signal of the plurality of audio signals in response to a scaling of the signal level indication for the first audio signal by a value determined by integrating a directivity pattern of the sound source represented by the first audio signal.

This may provide particularly advantageous operation in many embodiments. The scaling may be any function applied to the signal level indication in connection with determining the downmix coefficients. The function may typically be monotonically increasing as a function of the total emitted energy indication. The scaling may be a linear or non-linear scaling.

The scaling may be independent of the temporal variation of the signal and therefore may not need to be updated with instantaneous levels of the audio signal and may only need to be recalculated when the signal level indication or directivity pattern changes.

According to an optional feature of the invention, the signal level indication for a first audio signal of the plurality of audio signals comprises a reference distance, the reference distance indicating a distance from the audio source represented by the first audio signal for a distance reference gain for the first audio signal.

This may provide particularly advantageous operation in many embodiments. The distance reference gain may be a predetermined value, and may typically be common to at least some and often all audio sources and signals. In many embodiments, the distance reference gain may be 0 dB.

According to an optional feature of the invention, the integration is performed for a distance being the reference distance from the audio source represented by the first audio signal.

This may provide a particularly efficient approach and may facilitate operation.

According to an optional feature of the invention, the diffuse reverberation signal to total signal relationship is indicative of an energy of diffuse reverberation sound relative to an energy of total emitted sound in the environment.

This may provide particularly advantageous operation in many embodiments.

According to an optional feature of the invention, the diffuse signal to total signal relationship is indicative of an initial amplitude of diffuse sound relative to an energy of total emitted sound in the environment.

This may provide particularly advantageous operation in many embodiments.

According to an optional feature of the invention, the downmix coefficient determined for a first audio signal of the plurality of audio signals is independent of a position of a first audio source represented by the first audio signal.

This may provide particularly advantageous operation in many embodiments, and may in particular facilitate operation for dynamic applications with sound sources changing positions, such as for virtual reality applications.

According to an optional feature of the invention, the downmix coefficient determined for a first audio signal of the plurality of audio signals is independent of a position of a listener.

This may provide particularly advantageous operation in many embodiments, and may in particular facilitate operation for dynamic applications with changing positions, such as for virtual reality applications.

In some embodiments, the processing of the audio apparatus is independent of audio source positions. In some embodiments, the processing of the audio apparatus is independent of the listener position.

In some embodiments, the processing of the audio apparatus is only independent of the listener position within a region for which the diffuse signal to total signal ratio applies.

In some embodiments, an update rate for downmix coefficients is lower than an update rate for positions of a first audio source represented by the first audio signal. In some embodiments, an update rate for downmix coefficients is lower than an update rate for positions of a listener. The downmix coefficients may be calculated at a much lower temporal rate than the update rate of the listener position/audio source position.

According to an optional feature of the invention, the signal level indication for a first audio signal of the plurality of audio signals further comprises a gain indication for the first audio signal, the gain indication being indicative of a gain to apply to the first audio signal when rendering sound from a first audio source represented by the first audio signal, and wherein the circuit is arranged to determine the downmix coefficient for the first audio signal in response to the gain indication.

According to an optional feature of the invention, the audio apparatus further comprises a direct rendering circuit arranged to generate a direct path audio signal for a first audio signal of the plurality of audio signals in response to a signal level indication and directivity data for the first audio signal.

This may provide particularly advantageous operation in many embodiments.

In accordance with an optional feature of the invention, the metadata further comprises a delay indication and the diffuse signal to total signal ratio (the DSR) is indicative of an energy of diffuse reverberation sound in the environment having a delay longer than a delay indicated by the delay indication relative to an energy of total emitted sound.

The energy of diffuse reverberation sound in the environment having a delay longer than the delay indication may reflect/be determined by/as room impulse response contributions occurring at least a certain delay after emission of the corresponding sound at an audio source, where the certain delay is indicated by the delay indication.

In some embodiments the diffuse signal to total signal ratio (the DSR) is indicative of an energy of diffuse reverberation sound relative to an energy of total emitted sound in the environment wherein the energy of diffuse reverberation sound is determined by room response contributions occurring at least a certain delay after emission of the corresponding sound at an audio source.

According to another aspect of the invention, there is provided a method of generating a diffuse reverberation signal for an environment, the method comprising: receiving a plurality of audio signals representing sound sources in the environment: receiving metadata for the plurality of audio signals, the metadata comprising: a diffuse reverberation signal to total signal relationship indicative of a level of diffuse reverberation sound relative to total emitted sound in the environment, and for each audio signal: a signal level indication: directivity data indicative of directivity of sound radiation from the sound source represented by the audio signal: for each of the plurality of audio signals, determining: a total emitted energy indication based on the signal level indication and the directivity data, and a downmix coefficient based on the total emitted energy and the diffuse reverberation signal to total signal relationship: generating a downmix signal by combining signal components for each audio signal generated by applying the downmix coefficient for each audio signal to the audio signal: generating the diffuse reverberation signal for the environment from the downmix signal component.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
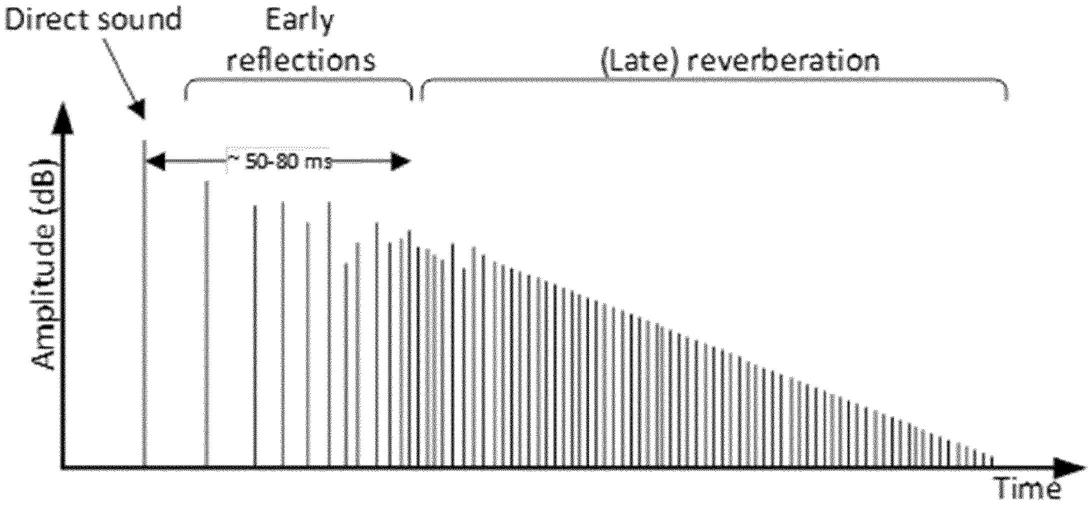
FIG. 1 illustrates an example of a room impulse response.
Figure 2:
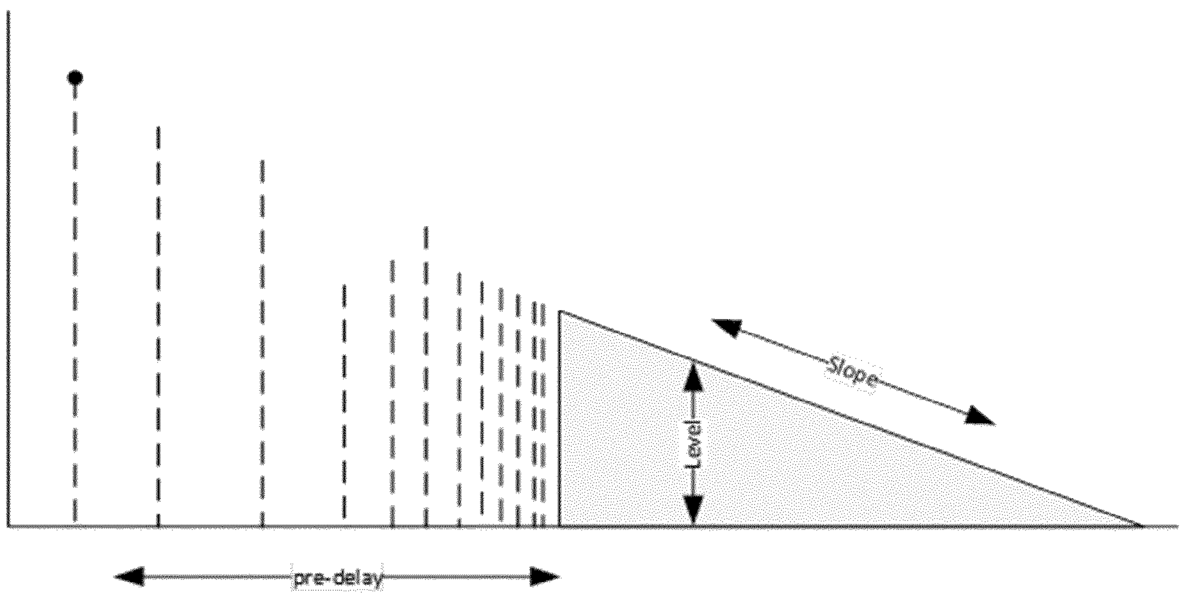
FIG. 2 illustrates an example of a room impulse response.

The following description will focus on audio processing and -generation for a virtual reality application, but it will be appreciated that the described principles and concepts may be used in many other applications and embodiments.

Virtual experiences allowing a user to move around in a virtual world are becoming increasingly popular and services are being developed to satisfy such a demand.

In some systems, the VR application may be provided locally to a viewer by e.g. a stand-alone device that does not use, or even have any access to, any remote VR data or processing. For example, a device such as a games console may comprise a store for storing the scene data, input for receiving/generating the viewer pose, and a processor for generating the corresponding images from the scene data.

In other systems, the VR application may be implemented and performed remote from the viewer. For example, a device local to the user may detect/receive movement/pose data which is transmitted to a remote device that processes the data to generate the viewer pose. The remote device may then generate suitable view images and corresponding audio signals for the user pose based on scene data describing the scene. The view images and corresponding audio signals are then transmitted to the device local to the viewer where they are presented. For example, the remote device may directly generate a video stream (typically a stereo/3D video stream) and corresponding audio stream which is directly presented by the local device. Thus, in such an example, the local device may not perform any VR processing except for transmitting movement data and presenting received video data.

In many systems, the functionality may be distributed across a local device and remote device. For example, the local device may process received input and sensor data to generate user poses that are continuously transmitted to the remote VR device. The remote VR device may then generate the corresponding view images and corresponding audio signals and transmit these to the local device for presentation. In other systems, the remote VR device may not directly generate the view images and corresponding audio signals but may select relevant scene data and transmit this to the local device, which may then generate the view images and corresponding audio signals that are presented. For example, the remote VR device may identify the closest capture point and extract the corresponding scene data (e.g. a set of object sources and their position metadata) and transmit this to the local device. The local device may then process the received scene data to generate the images and audio signals for the specific, current user pose. The user pose will typically correspond to the head pose, and references to the user pose may typically equivalently be considered to correspond to the references to the head pose.

In many applications, especially for broadcast services, a source may transmit or stream scene data in the form of an image (including video) and audio representation of the scene which is independent of the user pose. For example, signals and metadata corresponding to audio sources within the confines of a certain virtual room may be transmitted or streamed to a plurality of clients. The individual clients may then locally synthesize audio signals corresponding to the current user pose. Similarly, the source may transmit a general description of the audio environment including describing audio sources in the environment and acoustic characteristics of the environment. An audio representation may then be generated locally and presented to the user, for example using binaural rendering and processing.

Figure 3:
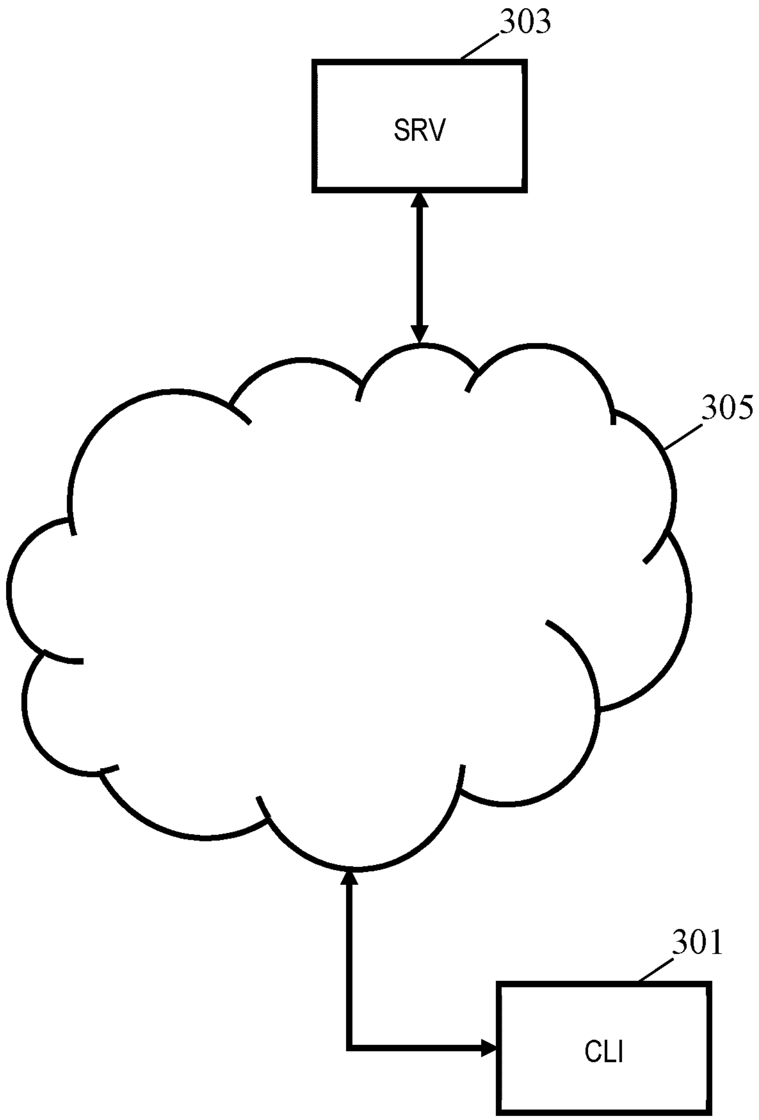
FIG. 3 illustrates an example of elements of virtual reality system.

FIG. 3 illustrates such an example of a VR system in which a remote VR client device 301 liaises with a VR server 303 e.g. via a network 305, such as the Internet. The server 303 may be arranged to simultaneously support a potentially large number of client devices 301.

The VR server 303 may for example support a broadcast experience by transmitting an image signal comprising an image representation in the form of image data that can be used by the client devices to locally synthesize view images corresponding to the appropriate user poses (a pose refers to a position and/or orientation). Similarly, the VR server 303 may transmit an audio representation of the scene allowing the audio to be locally synthesized for the user poses. Specifically, as the user moves around in the virtual environment, the image and audio synthesized and presented to the user is updated to reflect the current (virtual) position and orientation of the user in the (virtual) environment.

In many applications, such as that of FIG. 3, it may thus be desirable to model a scene and generate an efficient image and audio representation that can be efficiently included in a data signal that can then be transmitted or streamed to various devices which can locally synthesize views and audio for different poses than the capture poses.

In some embodiments, a model representing a scene may for example be stored locally and may be used locally to synthesize appropriate images and audio. For example, an audio model of a room may include an indication of properties of audio sources that can be heard in the room as well as acoustic properties of the room. The model data may then be used to synthesize the appropriate audio for a specific position.

It is a critical question how the audio scene is represented and how this representation is used to generate audio. Audio rendering aimed at providing natural and realistic effects to a listener typically includes rendering of an acoustic environment. For many environments, this includes the representation and rendering of diffuse reverberation present in the environment, such as in a room. The rendering and representation of such diffuse reverberation has been found to have a significant effect on the perception of the environment, such as on whether the audio is perceived to represent a natural and realistic environment. In the following, advantageous approaches will be described for representing an audio scene, and of rendering audio, and in particular diffuse reverberation audio, based on this representation.

Figure 4:
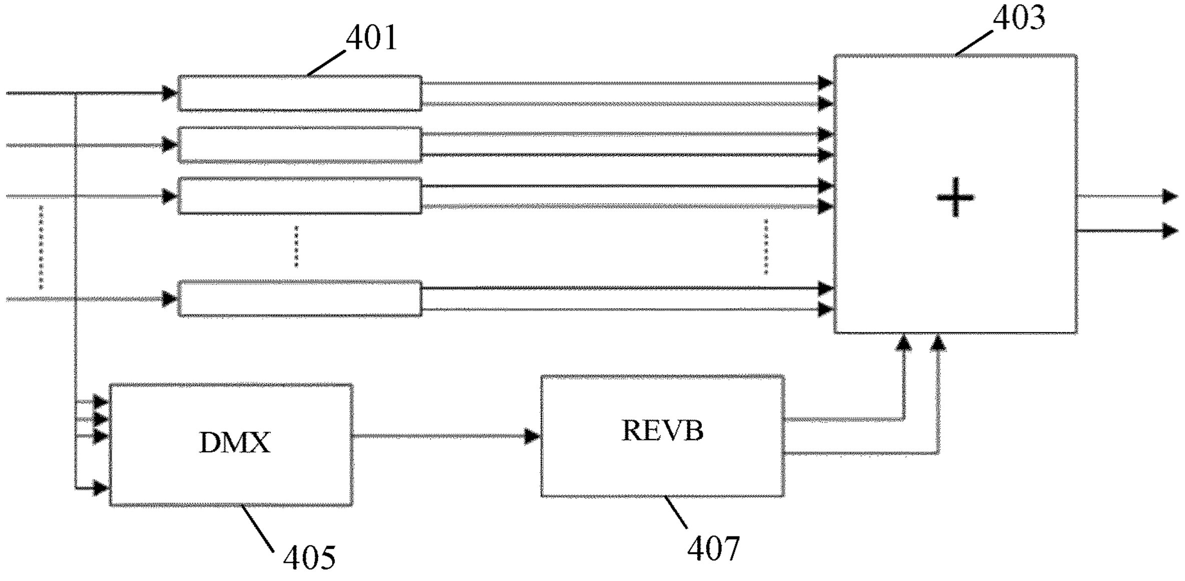
FIG. 4 illustrates an example of an audio apparatus for generating an audio output in accordance with some embodiments of the invention.

The approach will be described with reference to an audio apparatus as illustrated in FIG. 4. The audio apparatus is arranged to generate an audio output signal that represents audio in an acoustic environment. Specifically, the audio apparatus may generate audio representing the audio perceived by a user moving around in a virtual environment with a number of audio sources and with given acoustic properties. Each audio source is represented by an audio signal representing the sound from the audio source as well as metadata that may describe characteristics of the audio source (such as providing a level indication for the audio signal). In addition, metadata is provided to characterize the acoustic environment.

The audio apparatus comprises a path renderer 401 for each audio source. Each path renderer 401 is arranged to generate a direct path signal component representing the direct path from the audio source to the listener. The direct path signal component is generated based on the positions of the listener and the audio source and may specifically generate the direct signal component by scaling the audio signal, potentially frequency dependently, for the audio source depending on the distance and e.g. relative gain for the audio source in the specific direction to the user (e.g. for non-omnidirectional sources).

In many embodiments, the renderer 401 may also generate the direct path signal based on occluding or diffracting (virtual) elements that are in between the source and user positions.

In many embodiments, the path renderer 401 may also generate further signal components for individual paths where these include one or more reflections. This may for example be done by evaluating reflections of walls, ceiling etc. as will be known to the skilled person. The direct path and reflected path components may be combined into a single output signal for each path renderer and thus a single signal representing the direct path and early/discrete reflections may be generated for each audio source.

In some embodiments, the output audio signal for each audio source may be a binaural signal and thus each output signal may include both a left car and a right car (sub) signal.

The output signals from the path renderers 401 are provided to a combiner 403 which combines the signals from the different path renderers 401 to generate a single combined signal. In many embodiments, a binaural output signal may be generated and the combiner may perform a combination, such as a weighted combination, of the individual signals from the path renderers 401, i.e. all the right car signals from the path renderers 401 may be added together to generate the combined right car signals and all the left ear signals from the path renderers 401 may be added together to generate the combined left car signals.

The path renderers and combiner may be implemented in any suitable way including typically as executable code for processing on a suitable computational resource, such as a microcontroller, microprocessor, digital signal processor, or central processing unit including supporting circuitry such as memory etc. It will be appreciated that the plurality of path renderers may be implemented as parallel functional units, such as e.g. a bank of dedicated processing unit, or may be implemented as repeated operations for each audio source. Typically, the same algorithm/code is executed for each audio source/signal.

In addition to the individual path audio components, the audio apparatus is further arranged to generate a signal component representing the diffuse reverberation in the environment. The diffuse reverberation signal is (efficiently) generated by combining the source signals into a downmix signal and then applying a reverberation algorithm to the downmix signal to generate the diffuse reverberation signal.

The audio apparatus of FIG. 4 comprises a downmixer 405 which receives the audio signals for a plurality of the sound sources (typically all sources inside the acoustic environment for which the reverberator is simulating the diffuse reverberation), and combines them into a downmix. The downmix accordingly reflects all the sound generated in the environment. The downmix is fed to a reverberator 407 which is arranged to generate a diffuse reverberation signal based on the downmix. The reverberator 407 may specifically be a parametric reverberator such as a Jot reverberator. The reverberator 407 is coupled to the combiner 403 to which the diffuse reverberation signal is fed. The combiner 403 then proceeds to combine the diffuse reverberation signal with the path signals representing the individual paths to generate a combined audio signal that represents the combined sound in the environment as perceived by the listener.

Figure 5:
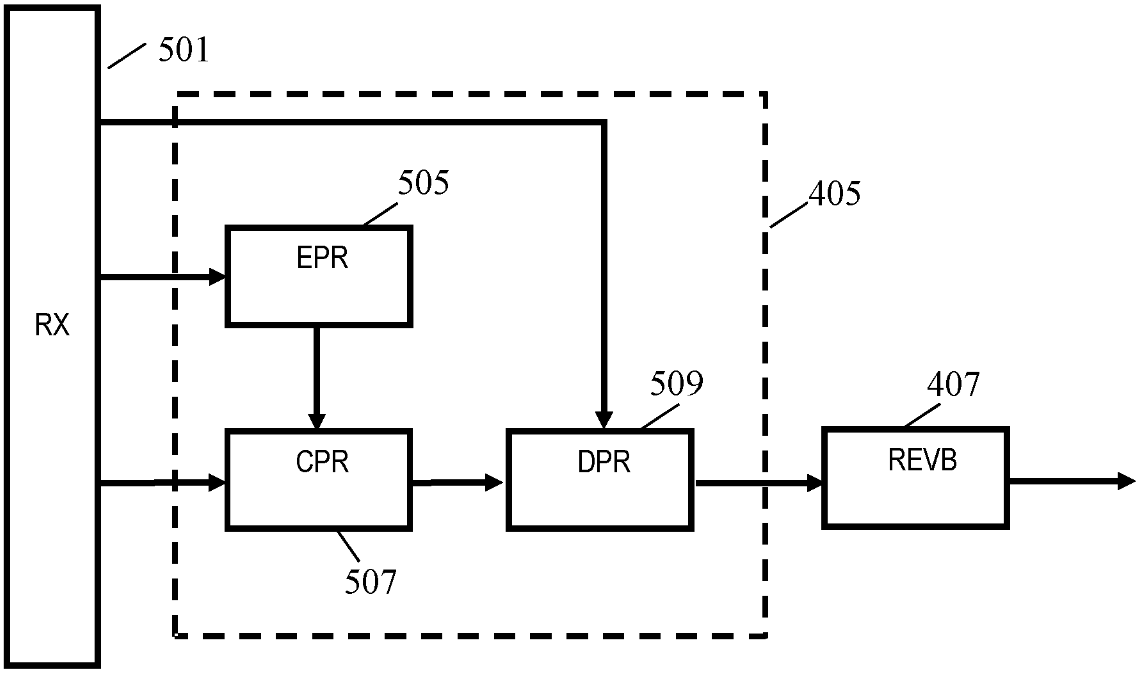
FIG. 5 illustrates an example of an audio reverberation apparatus for generating a diffuse reverberation signal in accordance with some embodiments of the invention.

The generation of the diffuse reverberation signal will be described further with reference to an audio reverberation apparatus as illustrated in FIG. 5. The audio reverberation apparatus may be included in the audio apparatus of FIG. 4 and may specifically implement the downmixer 405 and the reverberator 407.

The audio reverberation apparatus comprises a receiver 501 which is arranged to receive audio scene data representing audio. The audio scene data specifically includes a plurality of audio signals where each of the audio signals represent one audio source (and thus an audio signal describes the sound from an audio source). In addition, the receiver 501 receives metadata for each of the audio sources. This metadata includes a (relative) signal level indication for the audio source where the signal level indication may be indicative of a level/energy/amplitude of the sound source represented by the audio signal. The metadata for a source further includes directivity data indicative of directivity of sound radiation from the sound source. The directivity data for an audio signal may for example describe a gain pattern and may specifically describe the relative gain/energy density for the audio source in different directions from the position of the audio source.

The receiver 501 further receives metadata indicative of the acoustic environment. Specifically, the receiver 501 receives a diffuse reverberation signal to total signal relationship and specifically a diffuse reverberation signal to total signal ratio (can also be referred to as a diffuse reverberation signal level to total signal level ratio or in some cases diffuse reverberation signal level to total signal energy ratio, or emitted energy to diffuse reverberation energy ratio) which is indicative of a level of diffuse reverberation sound relative to total emitted sound in the acoustic environment. The diffuse reverberation signal to total signal ratio will in the following for brevity also be referred to as the Diffuse to Source Ratio DSR or equivalently the Source to Diffuse Ratio. SDR (the following description will predominantly use the former).

It will be appreciated that a ratio and an inverse ratio may provide the same information. i.e. that any ratio can be expressed as the inverse ratio. Thus, the diffuse reverberation signal to total signal relationship may be expressed by a fraction of a value reflecting the level of diffuse reverberation sound divided by a value reflecting the total emitted sound, or equivalently by a fraction of value reflecting the total emitted sound divided by a value reflecting the level of diffuse reverberation sound. It will also be appreciated that various modifications of the estimated values can be introduced. e.g. a non-linear function can be applied (e.g. a logarithmic function).

Any indication of a diffuse reverberation signal to total signal relationship that is indicative of a level of diffuse reverberation sound relative to total emitted sound in the acoustic environment may be used and provided in the metadata. The following description will focus on the relationship being represented by a ratio between a level of the diffuse reverberation signal to a level (e.g. energy or energy density) of total signal ratio. Thus, the description will focus on an example of a diffuse reverberation signal to total signal ratio that will also be referred to as the DSR.

The receiver 501 may be implemented in any suitable way including e.g. using discrete or dedicated electronics. The receiver 501 may for example be implemented as an integrated circuit such as an Application Specific Integrated Circuit (ASIC). In some embodiments, the circuit may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The receiver 501 may receive the audio scene data from any suitable source and in any suitable form, including e.g. as part of an audio signal. The data may be received from an internal or external source. The receiver 401 may for example be arranged to receive the room data via a network connection, radio connection, or any other suitable connection to an internal source. In many embodiments, the receiver may receive the data from a local source, such as a local memory. In many embodiments, the receiver 501 may for example be arranged to retrieve the room data from local memory, such as local RAM or ROM memory.

The receiver 501 may be coupled to the path renderers 401 and may forward the audio scene data to these for the generation of the path signal components (direct path and early reflections) as previously described.

The audio reverberation apparatus further comprises the downmixer 405 which is also fed the audio scene data. The downmixer 405 comprises an energy circuit/processor 505, a coefficient circuit/processor 507, and a downmix circuit/processor 509.

The downmixer 405, and indeed each of the energy circuit/processor 505, coefficient circuit/processor 507, and downmix circuit/processor 509 may be implemented in any suitable way including e.g. using discrete or dedicated electronics. The receiver 501 may for example be implemented as an integrated circuit such as an Application Specific Integrated Circuit (ASIC). In some embodiments, a circuit/processor may be implemented as a programmed processing unit, such as for example as firmware or software running on a suitable processor, such as a central processing unit, digital signal processing unit, or microcontroller etc. It will be appreciated that in such embodiments, the processing unit may include on-board or external memory, clock driving circuitry, interface circuitry, user interface circuitry etc. Such circuitry may further be implemented as part of the processing unit, as integrated circuits, and/or as discrete electronic circuitry.

The coefficient processor 507 is arranged to determine downmix coefficients for at least some of the received audio signals. The downmix coefficient for an audio signal may correspond to a weighting for that audio signal in the downmix. The downmix coefficient may be a weight for the audio signal in a weighted combination generating the downmix signal. Thus, the downmix coefficients may be relative weights for the audio signals when combining these to generate the downmix signal (which in many embodiments is a mono signal), e.g. they may be the weights of a weighted summation.

The coefficient processor 507 is arranged to generate the downmix coefficients based on the received diffuse reverberation signal to total signal ratio, i.e. the Diffuse to Source Ratio, DSR.

The coefficients are further determined in response to a determined total emitted energy indication which is indicative of the total energy emitted from the audio source. Whereas the DSR is typically common for some, and typically all of the audio signals, the total emitted energy indication is typically specific to each audio source.

The total emitted energy indication is typically indicative of a normalized total emitted energy. The same normalization may be applied to all the audio sources and to the direct and reflect path components. Thus, the total emitted energy indication may be a relative value with respect to the total emitted energy indications for other audio sources/signals or with respect to the individual path components or with respect to a full-scale sample value of an audio signal.

The total emitted energy indication when combined with the DSR may for each audio source provide a downmix coefficient which reflects the relative contribution to the diffuse reverberation sound from that audio source. Thus, determining the downmix coefficient as a function of the DSR and the total emitted energy indication can provide downmix coefficients that reflect the relative contribution to the diffuse sound. Using the downmix coefficients to generate a downmix signal can thus result in a downmix signal which reflects the total generated sound in the environment with each of the sound sources weighted appropriately and with the acoustic environment being accurately modelled.

In many embodiments, the downmix coefficient as a function of the DSR and the total emitted energy indication combined with a scaling in response to reverberator (407) properties may provide downmix coefficients that reflect the appropriate relative level of the diffuse reverberation sound with respect to the corresponding path signal components.

The energy processor 505 is coupled to the coefficient processor 507 and is arranged to determine the total emitted energy indications from the metadata received for the audio sources.

The received metadata includes a signal reference level for each source which provides an indication of a level of the audio. The signal reference level is typically a normalized or relative value which provides an indication of the signal reference level relative to other audio sources or relative to a normalized reference level. Thus, the signal reference level may typically not indicate the absolute sound level for a source but rather a relative level relative to other audio sources.

In the specific example, the signal reference level may include an indication in the form of a reference distance which provides a distance for which a distance attenuation to be applied to the audio signal is 0 dB. Thus, for a distance between the audio source and the listener equal to the reference distance, the received audio signal can be used without any distance dependent scaling. For a distance less than the reference distance, the attenuation is less and thus a gain higher than 0 dB should be applied when determining the sound level at the listening position. For a distance higher than the reference distance, the attenuation is higher and thus an attenuation higher than 0 dB should be applied when determining the sound level at the listening position. Equivalently, for a given distance between the audio source and the listening position, a higher gain will be applied to an audio signal associated with a higher reference distance than one associated with a shorter reference distance. As the audio signal is typically normalized to represent meaningful reference distance or to exploit the full dynamic range (e.g. a jet engine and a cricket will both be represented by audio signals exploiting the full dynamic range of the data words used), the reference distance provides an indication of the signal reference level for the specific audio source.

In the example, the signal reference level is further indicated by a reference gain referred to as a pre-gain. The reference gain is provided for each audio source and provides a gain that should be applied to the audio signal when determining the rendered audio levels. Thus, the pre-gain may be used to further indicate level variations between the different audio sources.

The metadata further includes directivity data which is indicative of directivity of sound radiation from the sound source represented by the audio signal. The directivity data for each audio source may be indicative of a relative gain, relative to the signal reference level, in different directions from the audio source. The directivity data may for example provide a full function or description of a radiation pattern from the audio source defining the gain in each direction. As another example, a simplified indication may be used such as e.g. a single data value indicating a predetermined pattern. As yet another example, the directivity data may provide individual gain values for a range of different direction intervals (e.g. segments of a sphere).

The metadata together with the audio signals may thus allow audio levels to be generated. Specifically, the path renderers may determine the signal component for the direct path by applying a gain to the audio signal where the gain is a combination of the pre-gain, a distance gain determined as a function of the distance between the audio source and the listener and the reference distance, and the directivity gain in the direction from the audio source to the listener.

With respect to the generation of the diffuse reverberation signal, the metadata is used to determine a (normalized) total emitted energy indication for an audio source based on the signal reference level and the directivity data for the audio source.

Specifically, the total emitted energy indication may be generated by integrating the directivity gain over all directions (e.g. integrating over a surface of a sphere centered at the position of the audio source) and scaled by the signal reference level, and specifically by the distance gain and the pre-gain.

The determined total emitted energy indication is then fed to the coefficient processor 507 where it is processed with the DSR to generate the downmix coefficients.

The downmix coefficients are then used by the downmix processor 509 to generate the downmix signal. Specifically, the downmix signal may be generated as a combination, and specifically summation, of the audio signals with each audio signal being weighted by the downmix coefficient for the corresponding audio signal.

The downmix is typically generated as a mono-signal which is then fed to the reverberator 407 which proceeds to generate the diffuse reverberation signal.

It should be noted that whereas the rendering and generation of the individual path signal components by the path renderers 401 is position dependent e.g. with respect to determining the distance gain and the directivity gain, then the generation of the diffuse reverberation signal can be independent of the position of both the source and of the listener.

The total emitted energy indication can be determined based on the signal reference level and the directivity data without considering the positions of the source and listener. Specifically, pre-gain and the reference distance for a source can be used to determine a non-directivity dependent signal reference level at a nominal distance from the source (the nominal distance being the same for all audio signals/sources) and which is normalized with respect to e.g. a full-scale sample of the audio signals. The integration of the directivity gains over all directions can be performed for a normalized sphere, such as e.g. for a sphere at the reference distance. Thus, the total emitted energy indication will be independent of the source and listener position (reflecting that diffuse reverberation sound tends to be homogenous in an environment such as a room). The total emitted energy indication is then combined with the DSR to generate the downmix coefficients (in many embodiments other parameters such as parameters of the reverberator may also be considered). As the DSR is also independent of the positions, as is the downmix and reverberation processing, the diffuse reverberation signal may be generated without any consideration of the specific positions of the source and listener.

Such an approach may provide a high performance and naturally sounding audio perception without requiring excessive computational resource. It may be particularly suitable for e.g. virtual reality applications where a user (and sources) may move around in the environment and thus where the relative positions of the listener (and possibly some or all of the audio sources) may change dynamically.

In the following specific aspects of various embodiments of the approach of FIGS. 4 and 5 will be described in more detail.

In many embodiments, the metadata may further comprise an indication of when the diffuse reverberation signal should begin, i.e. it may indicate a time delay associated with the diffuse reverberation signal. The time delay indication may specifically be in the form of a pre-delay.

The pre-delay may represent the delay/lag in a RIR and may be defined to be the threshold between early reflections and diffuse, late reverberation. Since this threshold typically occurs as part of a smooth transition from (more or less) discrete reflections into a mix of fully interfering high order reflections, a suitable threshold may be selected using a suitable evaluation/decision process. The determination can be made automatic based on analysis of the RIR, or calculated based on room dimensions and/or material properties.

Alternatively, a fixed threshold, such as e.g. 80 ms into the RIR, can be chosen. Pre-delay can be indicated in seconds, milliseconds or samples. In the following description, the pre-delay is assumed to be chosen to be at a point after which the reverb is actually diffuse. However, the described method may still work sufficiently if this is not the case.

Figure 6:
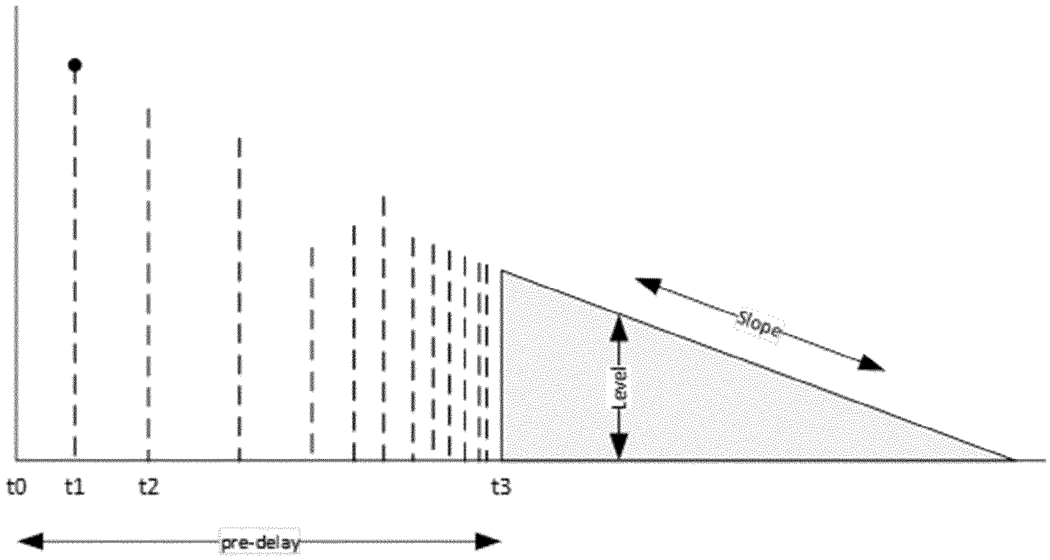
FIG. 6 illustrates an example of a room impulse response.

The pre-delay is therefore indicative of the onset of the diffuse reverb response from the onset of the source emission. E.g. for an example as shown in FIG. 6, if a source starts emitting at to (e.g. t0=0), the direct sound reaches the user at t1>t0, the first reflection reaches the user at t2>t1 and the defined threshold between early reflections and diffuse reverberation reaches the user at t3>t2. Then the pre-delay is t3-t0.

In the system, the diffuse reverberation signal to total signal ratio, i.e. the Diffuse to Source Ratio, DSR, may be used to express the amount of diffuse reverberation energy or level of a source received by a user as a ratio of total emitted energy of that source. It may be expressed in a way that the diffuse reverberation energy is appropriately conditioned for the level calibration of the signals to be rendered and corresponding metadata (e.g. pre-gain).

Expressing it in this way may ensure that the value is independent of the absolute positions and orientations of the listener and source in the environment, independent of the relative position and orientation of the user with respect to the source and vice versa, independent of specific algorithms for rendering reverberation, and that there is a meaningful link to the signal levels used in the system.

The described approach calculates downmix coefficients that take into account both directivity patterns to impose the correct relative levels between the source signals, and the DSR to achieve the correct level on the output of reverberator 407.

The DSR may represent the ratio between emitted source energy and a diffuse reverberation property, such as specifically the energy or the (initial) level of the diffuse reverberation signal.

The description will mainly focus on an DSR indicative of the diffuse reverberation energy relative to the total energy:

$$DSR = \frac{\text{diffuse reverb energy}}{\text{total emitted energy}}$$

The diffuse reverberation energy may be considered to be the energy created by the room response from the start of the diffuse section, e.g. it may be the energy of the RIR from a time indicated by pre-delay until infinity. Note that subsequent excitations of the room will add up to reverb energy, so this can typically only be directly measured by excitation with a Dirac pulse. Alternatively, it can be derived from a measured RIR.

The reverberation energy represents the energy in a single point in the diffuse field space instead of integrated over the entire space.

A particularly advantageous alternative to the above would be to use an DSR that is indicative of an initial amplitude of diffuse sound relative to an energy of total emitted sound in the environment. Specifically, the DSR may indicate the reverberation amplitude at the time indicated by the pre-delay.

The amplitude at pre-delay may be the largest excitation of the room impulse response at or closely after pre-delay. E.g. within 5, 10, 20 or 50 ms after pre-delay. The reason for choosing the largest excitation in a certain range is that at the pre-delay time, the room impulse response may coincidentally be in a low part of the response. With the general trend being a decaying amplitude, the largest excitation in a short interval after the pre-delay is typically also the largest excitation of the entire diffuse reverberation response.

Using an DSR indicative of an initial amplitude (within an interval of e.g. 10 msec) makes it easier and more robust to map DSR to parameters in many reverberation algorithms. The DSR may thus in some embodiments be given as:

$$DSR = \frac{\text{diffuse reverb initial amplitude}}{\text{total emitted energy}}$$

The parameters in the DSR are expressed with respect to the same source signal level reference.

This can, for example, be achieved by measuring (or simulating) the RIR of the room of interest with a microphone within certain known conditions (such as distance between source and microphone and the directivity pattern of the source). The source should emit a calibrated amount of energy into the room, e.g. a Dirac impulse with known energy.

A calibration factor for electrical conversions in the measurement equipment and analog to digital conversion can be measured or derived from specifications. It can also be calculated from the direct path response in the RIR which is predictable from the directivity pattern of the source and source-microphone distance. The direct response has a certain energy in the digital domain, and represents the emitted energy multiplied by the directivity gain for the direction of the microphone and a distance gain that may depend on the microphone surface relative to the total sphere surface area with radius equal to the source-microphone distance.

Both elements should use the same digital level reference. E.g. a full-scale 1 kHz sine corresponds to 100 dB SPL.

Measuring the diffuse reverberation energy from the RIR and compensating it with the calibration factor gives the appropriate energy in the same domain as the known emitted energy. Together with the emitted energy, the appropriate DSR can be calculated.

The reference distance may indicate the distance at which the distance gain to apply to the signal is 0 dB, i.e. where no gain or attenuation should be applied to compensate for the distance. The actual distance gain to apply by the path renderers 401 can then be calculated by considering the actual distance relative to the reference distance.

Representing the effect of distance to the sound propagation is performed with reference to a given distance. A doubling of the distance reduces the energy density (energy per surface unit) by 6 dB. A halving of the distance induces the energy density (energy per surface unit) by 6 dB.

In order to determine the distance gain at a given distance, distance corresponding to a given level must be known so the relative variation for the current distance can be determined, i.e. in order to determine how much the density has reduced or increased.

Ignoring absorption in air and assuming no reflections or occluding elements are present, the emitted energy of a source is constant on any sphere with any radius centered on the source position. The ratio of the surface corresponding to the actual distance vs the reference distance indicates the attenuation of the energy. The linear signal amplitude gain at rendering distance d can be represented b:

$$g_{dist} = \sqrt{\frac{A_{ref}}{A_{rend}}} = \sqrt{\frac{4\pi r_{ref}^2}{4\pi d^2}} = \frac{r_{ref}}{d}$$

where $r_{ref}$ is the reference distance.

As an example, this results in a signal attenuation of about 6 dB (or gain of −6 dB) if the reference distance is 1 meter and the rendering distance is 2 meters.

The total emitted energy indication may represent the total energy that a sound source emits. Typically, sound sources radiate out in all directions, but not equally in all directions. An integration of energy densities over a sphere around a source may provide the total emitted energy. In case of a loudspeaker, the emitted energy can often be calculated with knowledge of the voltage applied to the terminals and loudspeaker coefficients describing the impedance, energy losses and transfer of electric energy into sound pressure waves.

The energy processor 505 is arranged to determine the total emitted energy indication by considering the directivity data for the audio source. It should be noted that it is important to use the total emitted energy rather than just the signal level or the signal reference level when determining diffuse reverberation signals for sources that may have varying source directivity. E.g., consider a source directivity corresponding to a very narrow beam with directivity coefficient 1, and with a coefficient of 0 for all other directions (i.e. energy is only transmitted in the very narrow beam). In this case, the emitted source energy may be very similar to the energy of the audio signal and signal reference level as this is representative of the total energy. If another source with an audio signal with the same energy and signal reference level, but with an omnidirectional directivity is instead considered, the emitted energy of this source will be much higher than the audio signal energy and signal reference levels. Therefore, with both sources active at the same time, the signal of the omnidirectional source should be represented much stronger in the diffuse reverberation signal, and thus in the downmix, than the very directional source.

As mentioned, the energy processor 505 may determine the emitted energy from integrating the energy density over the surface of a sphere surrounding the audio source. Ignoring the distance gain, i.e. integrating over a surface for a radius where the distance gain is 0 dB (i.e. with a radius corresponding to the reference distance), a total emitted energy indication can be determined from:

$$E = \iint_S (g \cdot p \cdot x)^2 dS$$

where, g is the directivity gain function, p is the pre-gain associated with the audio signal/source and x indicates the level of the audio signal itself.

Since p is independent of direction, it can also be moved outside the integral. Similarly, the signal x is independent of the direction (the directivity gain reflects that variation). (It can be multiplied later, since:

$$g_1^{2}*x^2+g_2^{2}*x^2+g_3^{2}*x^2+ \ldots =(g_1^{2}+g_2^{2}+g_3^{2}+ \ldots )*x^2$$

and thus the integral becomes independent of the signal.)

One specific approach for determining this integral is described in more detail in the following.

It is desired to integrate the directivity gains over a sphere.

$$E_{scale} = \iint_S g^2 dS$$

The derivatives determine the vectors tangential to the sphere at the point of interest.

$$f_a=-r*\cos(e)*\sin(a)*u_x+r*\cos(e)*\cos(a)*u_y+0*u_z$$

$$f_e=-r*\sin(e)*\cos(a)*u_x-r*\sin(e)*\sin(a)*u_y+r*\cos(e)*u_z$$

Cross-product of the derivatives is a vector perpendicular to both.

$$f_a \times f_e=(r^2*\cos(e)*\cos(a)*\cos(e)+0*\sin(e)*\sin(a))*u_x+(-0*\sin(e)*\cos(a)+r^2*\cos(e)*\sin(a)*\cos(e))*u_y+(r^2*\cos(e)*\sin(a)*\sin(e)*\sin(a)+r^2*\cos(e)*\cos(a)*\sin(e)*\cos(a))*u_z$$

$$=r^2*\cos^2(e)*\cos(a)*u_x+r^2*\cos^2(e)*\sin(a)*u_y+(r^2*\cos(e)*\sin(e)*\sin^2(a)+r^2*\cos(e)*\sin(e)*\cos^2(a))*u_z$$

$$=r^2*\cos^2(e)*\cos(a)*u_x+r^2*\cos^2(e)*\sin(a)*u_y+(r^2*\cos(e)*\sin(e)*(\sin^2(a)+\cos^2(a)))*u_z$$

$$=r^2*\cos^2(e)*\cos(a)*u_x+r^2*\cos^2(e)*\sin(a)*u_y+r^2*\cos(e)*\sin(e)*u_z$$

Magnitude of the cross-product is the surface area of the parallelogram spanned by vectors f_a and f_e, and thus the surface area on the sphere:

$$|f_a \times f_e| = sqrt\left(\left(r^2*\cos^2(e)*\cos(a)\right)^2+\left(r^2*\cos^2(e)*\sin(a)\right)^2+\left(r^2*\cos(e)*\sin(e)\right)^2\right)$$
$$= sqrt\left(r^4*\cos^4(e)*\cos^2(a)+r^4*\cos^4(e)*\sin^2(a)+r^4*\cos^2(e)*\sin^2(e)\right)$$
$$= sqrt\left(r^4*\cos^4(e)*\cos^2(a)+\sin^2(a)+r^4*\cos^2(e)*\sin^2(e)\right)$$
$$= sqrt\left(r^4*\cos^4(e)+r^4*\cos^4(e)*\sin^2(e)\right)$$
$$= sqrt\left(r^4*\cos^4(e)*\cos^4(e)+\sin^2(e))\right)$$
$$= sqrt\left(r^4*\cos^4(e)\right)$$
$$= \text{abs}\left(r^4*\cos(e)\right) = r^2*\cos(e) \text{ when } e = [-0.5*pi, 0.5*pi]$$

Resulting in:

$$dS = r^2*\cos(e)*da*de$$

Using a sphere with radius equal to the reference distance (r) means that the distance gain is 0 dB and thus the distance gain/attenuation can be ignored.

A sphere is chosen in this example because it provides an advantageous calculation, but the same energy can be determined from any closed surface of any shape enclosing the source position. As long as the appropriate distance gain and directivity gain is used in the integral, and the effective surface is considered that is facing the source position (i.e. with a normal vector in line with the source position).

A surface integral should define a small surface dS. Therefore, defining a sphere with two parameters, azimuth (a) and elevation (e) provides the dimensions to do this. Using the coordinate system for our solution we get:

$$f(a,e,r)=r*\cos(e)*\cos(a)*u_x+r*\cos(e)*\cos(a)*u_y+r*\sin(e)*u_z$$

where $u_x$, $u_y$ and $u_z$ are unit base vectors of the coordinate system.

The small surface dS is the magnitude of the cross-product of partial derivatives of the sphere surface with respect to the two parameters, times the differentials of each parameter:

$$dS=|f_a \times f_e| da\ de$$

where the first two terms define a normalized surface area, and with the multiplication by da and de it becomes an actual surface, based on the size of the segments da and de. The double integral over the surface can then be expressed in terms of azimuth and elevation. The surface dS is, as per the above, expressed in terms of a and e. The two integrals can be performed over azimuth=0 . . . 2*pi (inner integral), and elevation=−0.5*pi . . . 0.5*pi (outer integral).

$$E_{scale} = \int_{-0.5\pi}^{0.5\pi} \int_{0}^{2\pi} g^2(a, e) \cdot r^2 \cos(e) \cdot da \cdot de$$

where g(a, e) is the directivity as a function of azimuth and elevation. Hence if g(a, e)=1, the result should be the surface of the sphere. (Working out the integral analytically as a proof results in 4*pi*$r^2$ as expected).

In many practical embodiments, the directivity pattern may not be provided as an integrable function, but e.g. as a discrete set of sample points. For example, each sampled directivity gain is associated with an azimuth and elevation. Typically, these samples will represent a grid on a sphere. One approach to handle this is to turn the integrals into summations, i.e. a discrete integration may be performed.

The integration may in this example be implemented as a summation over points on the sphere for which a directivity gain is available. This gives the values for g(a, e), but requires that da and de are chosen correctly, such that they do not result in large errors due to overlap or gaps.

In other embodiments, the directivity pattern may be provided as a limited number of non-uniformly spaced points in space. In this case, the directivity pattern may be interpolated and uniformly resampled over the range of azimuths and elevations of interest.

An alternative solution may be to assume g(a, e) to be constant around its defined point and solve the integral locally analytically. E.g. for a small azimuth and elevation range. E.g. midway between the neighboring defined points. This uses the above integral, but with different ranges of a and e, and g(a, e) assumed constant.

Experiments show that with the straightforward summation, errors are small, even with rather coarse resolution of the directivity. Further, the errors are independent of the radius. For linear spacing of azimuth between 10 points, and 10 linearly spaced points of elevation results in a relative error of −20 dB.

The integral as expressed above, provides a result that scales with the radius of the sphere. Hence, it scales with the reference distance. This dependency on the radius is because we do not take into account the inverse effect of 'distance gain' between the two different radii. If the radius doubles, the energy 'flowing' through a fixed surface area (e.g. 1 cm2) is 6 dB lower. Therefore, one could say that the integration should take into account distance gain. However, the integration is done at reference distance, which is defined as the distance at which the distance gain is reflected in the signal. In other words, the signal level indicated by the reference distance is not included as a scaling of the value being integrated but is reflected by the surface area over which the integration being performed varying with the reference distance (since the integration is performed over a sphere with radius equal to the reference distance).

As a result, the integral as described above reflects an audio signal energy scaling factor (including any pre-gain or similar calibration adjustment), because the audio signal represents the correct signal playback energy at a fixed surface area on the sphere with radius equal to the reference distance (without directivity gain).

That means that if the reference distance is larger, without changing the signal, the total signal energy scaling factor is also larger. This is because the corresponding signal represents a sound source that is relatively louder than one with the same signal energy, but at a smaller reference distance.

In other words, by performing the integration over the surface of a sphere with a radius equal to the reference distance, the signal level indication provided by the reference distance is automatically taken into account. A higher reference distance will result in a larger surface area and thus a larger total emitted energy indication. The integration is specifically performed directly at distance for which the distance gain is 1.

The integral above results in values that are normalized to the used surface unit and to the unit used for indicating the reference distance r. If the reference distance r is expressed in meters, then the result of the integral is provided in the unit of $m^2$.

To relate the estimated emitted energy value to the signal, it should be expressed in a surface unit that corresponds to the signal. Since the signal's level represents the level at which it should be played for a user at reference distance, the surface area of a human ear may be better suited. At the reference distance this surface relative to the whole sphere's surface would be related to the portion of the source's energy that one would perceive.

Therefore, a total emitted energy indication representing the emitted source energy normalized for full-scale samples in the audio signal can be indicated by:

$$E_{norm} = \frac{E_{dir,r} * p^2}{S_{ear}}$$

where $E_{dir,r}$ indicates the energy determined by integrating the directivity gain over the surface of a sphere with radius equal to the reference distance, p is the pre-gain, and $S_{ear}$ is a normalization scaling factor (to relate the determined energy to the area of a human ear).

With the DSR characterizing the diffuse acoustic properties of a space and the calculated emitted source energy derived from directivity, pre-gain and reference distance metadata, the corresponding reverberation energy can be calculated.

The DSR may typically be determined with the same reference levels used by both its components. This may or may not be the same as the total emitted energy indication. Regardless, when such an DSR is combined with the total emitted energy indication the resulting reverberation energy is also expressed as an energy that is normalized for full-scale samples in the audio signal, when the total emitted energy determined by the above integration is used. In other words, all the energies considered are essentially normalized to the same reference levels such that they can directly be combined without requiring level adjustments. Specifically, the determined total emitted energy can directly be used with the DSR to generate a level indication for the diffuse reverberation generated from each source where the level indication directly indicates the appropriate level with respect to the diffuse reverberation for other audio sources and with respect to the individual path signal components.

As a specific example, the relative signal levels for the diffuse reverberation signal components for the different sources may directly be obtained by multiplying the DSR by the total emitted energy indication.

In the described system, the adaptation of the contributions of different audio sources to the diffuse reverberation signal is at least partially performed by adapting downmix coefficients used to generate the downmix signal. Thus, the downmix coefficients may be generated such that the relative contributions/energy levels of the diffuse sound from each audio source reflect the determined diffuse reverberation energy for the sources.

As a specific example, if the DSR indicates an initial amplitude level, the downmix coefficients may be determined to be proportional to (or equal to) the DSR multiplied by the total emitted energy indication. If the DSR indicates an energy level, the downmix coefficients may be determined to be proportional to (or equal to) the square root of the DSR multiplied by the total emitted energy indication.

As a specific example, a downmix coefficient $d_x$ for providing an appropriate adjustment for signal with index x of the plurality of input signals may be calculated by:

$$d_x = p \cdot \sqrt{E_{\mathrm{norm},x} * DSR}$$

where p denotes pre-gain and $E_{norm,x} = E_{scale}/S_{ear}$ the normalized emitted source energy for signal x, prior to pre-gain. DSR represents the ratio of diffuse reverberation energy to emitted source energy. When the downmix coefficient $d_x$ is applied to the input signal x, the resulting signal is representing a signal level that, when filtered by a reverberator that has a reverberation response of unit energy, provides the correct diffuse reverberation energy for signal x with respect to the direct path rendering of signal x and with respect to direct paths and diffuse reverberation energies of other sources j≠x.

Alternatively, a downmix coefficient $d_x$ may be calculated according to:

$$d_x=E_{norm,x}*DSR$$

where $$E_{norm,x} = \frac{E_{dir,r} * p^2}{S_{ear}}$$

denotes the normalized emoted source energy for signal x and DSR represents the ratio of diffuse reverberation energy to initial reverberation response amplitude. When the downmix coefficient $d_x$ is applied to the input signal x, the resulting signal is representing a signal level that corresponds to the initial level of the diffuse reverberation signal, and can be processed by a reverberator that has a reverberation response that starts with amplitude 1. As a result, the output of the reverberator provides the correct diffuse reverberation energy for signal x with respect to the direct path rendering of signal x and with respect to direct paths and diffuse reverberation energies of other sources j≠x.

In many embodiments, the downmix coefficients are partially determined by combining the DSR with the total emitted energy indication. Whether the DSR indicates the relation of the total emitted energy to the diffuse reverberation energy or an initial amplitude for the diffuse reverberation response, a further adaptation of the downmix coefficients is often necessary to adapt for the specific reverberator algorithm used that scales the signals such that the output of the reverberation processor is reflecting the desired energy or initial amplitude. For example, the density of the reflections in a reverberation algorithm have a strong influence on the produced reverberation energy while the input level stays the same. As another example, the initial amplitude of the reverberation algorithm may not be equal to the amplitude of its excitation. Therefore, an algorithm-specific, or algorithm- and configuration-specific, adjustment may be needed. This can be included in the downmix coefficients and is typically common to all sources. For some embodiments these adjustments may be applied to the downmix or included in the reverberator algorithm.

Once the downmix coefficients are generated, the downmix processor 509 may generate the downmix signal e.g. by a direct weighted combination or summation.

An advantage of the described approach is that it may use a conventional reverberator. For example, the reverberator 407 may be implemented by a feedback delay network, such as e.g. implemented in a standard Jot reverberator.

Figure 7:
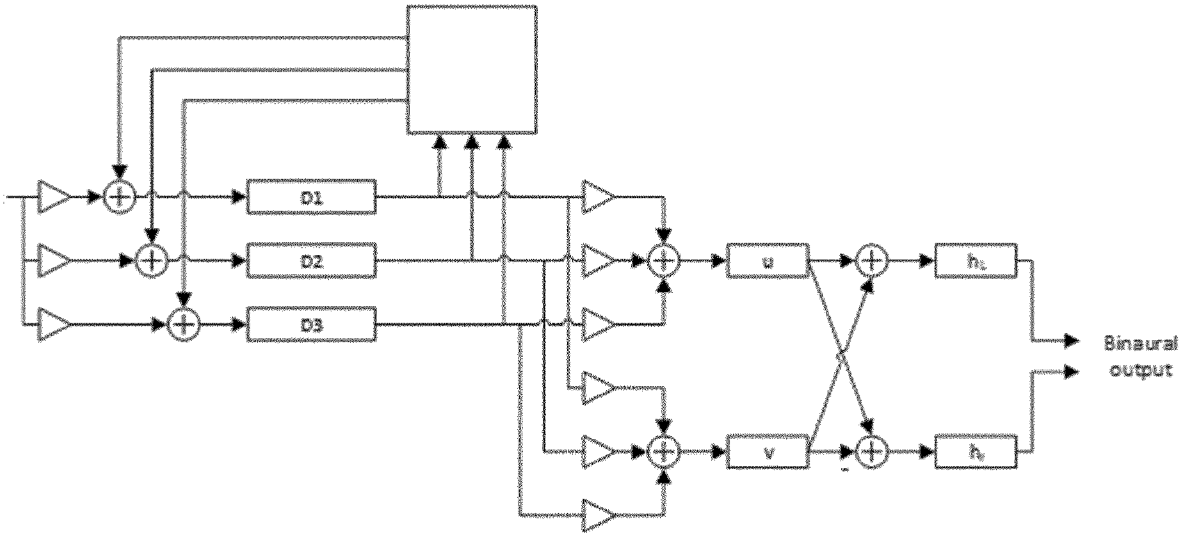
FIG. 7 illustrates an example of a reverberator.

As illustrated in FIG. 7, the principle of feedback delay networks uses one or more (typically more than one) feedback loops with different delays. An input signal, in the present case the downmix signal, is fed to loops where the signals are fed back with appropriate feedback gains. Output signals are extracted by combining signals in the loops. Signals are therefore continuously repeated with different delays. Using delays that are mutually prime and having a feedback matrix that mixes signals between loops can create a pattern that is similar to reverberation in real spaces.

The absolute value of the elements in the feedback matrix must be smaller than 1 to achieve a stable, decaying impulse response. In many implementations, additional gains or filters are included in the loops. These filters can control the attenuation instead of the matrix. Using filters has the benefit that the decaying response can be different for different frequencies.

In some embodiments where the output of the reverberator is binaurally rendered, the estimated reverberation may be filtered by the average HRTFs (Head Related Transfer Functions) for the left and right cars respectively in order to produce the left and right channel reverberation signals. When HRTFs are available for more than one distance at uniformly spaced intervals on a sphere around the user, one may appreciate that the average HRTFs for the left and right cars are generated using the set of HRTFs with the largest distance. Using average HRTFs may be based/reflect a consideration that the reverberation is isotropic and coming from all directions. Therefore, rather than including a pair of HRTFs for a given direction, an average over all HRTFs can be used. The averaging may be performed once for the left and once for the right ear, and the resulting filters may be used to process the output of the reverberator for binaural rendering.

The reverberator may in some cases itself introduce coloration of the input signals, leading to an output that does not have the desired output diffuse signal energy as described by the DSR. Therefore, the effects of this process may be equalized as well. This equalization can be performed based on filters that are analytically determined as the inverse of the frequency response of the reverberator operation. In some embodiments, the transfer function can be estimated using machine estimation learning techniques such as linear regression, line-fitting, etc.

In some embodiments, the same approach may be applied uniformly to the entire frequency band. However, in other embodiments, a frequency dependent processing may be performed. For example, one or more of the provided metadata parameters may be frequency dependent. In such an example, the apparatus may be arranged to divide the signals into different frequency bands corresponding to the frequency dependency and processing as described previously may be performed individually in each of the frequency bands.

Specifically, in some embodiments, the diffuse reverberation signal to total signal ratio. DSR, is frequency dependent. For example, different DSR values may be provided for a range of discrete frequency bands/bins or the DSR may be provided as a function of frequency. In such an embodiment, the apparatus may be arranged to generate frequency dependent downmix coefficients reflecting the frequency dependency of the DSR. For example, downmix coefficients for individual frequency bands may be generated. Similarly, a frequency dependent downmix and diffuse reverberation signal may be consequently be generated.

For a frequency dependent DSR, the downmix coefficients may in other embodiments be complemented by filters that filter the audio signal as part of the generation of the downmix. As another example, the DSR effect may be separated into a frequency independent (broadband) component used to generate frequency independent downmix coefficients used to scale the individual audio signals when generating the downmix signal and a frequency dependent component that may be applied to the downmix. e.g. by applying a frequency dependent filter to the downmix. In some embodiments, such a filter may be combined with further coloration filters. e.g. as part of the reverberator algorithm. FIG. 7 illustrates an example with correlation (u, v) and coloration ($h_L$, $h_R$) filters. This is a Feedback Delay Network specifically for binaural output, known as a Jot reverberator.

Thus, in some embodiments, the DSR may comprise a frequency dependent component part and a non-frequency dependent component part and the coefficient processor 507 may be arranged to generate the downmix coefficients in dependence on the non-frequency dependent component part (and independently of the frequency dependent part). The processing of the downmix may then be adapted based on the frequency dependent component part. i.e. the reverberator may be adapted in dependence on the frequency dependent part.

In some embodiments, the directivity of sound radiation from one or more of the audio sources may be frequency dependent and in such a scenario the energy processor 505 may be arranged to generate a frequency dependent total emitted energy which when combined with the DSR (which may be frequency dependent or independent) may result in frequency dependent downmix coefficients.

This may for example be achieved by performing individual processing in discrete frequency bands. In contrast to the processing for a frequency dependent DSR, the frequency dependency for the directivity must typically be performed prior to (or as part of) the generation of the downmix signal. This reflects that a frequency dependent downmix is typically required for including frequency dependent effects of directivity as these are typically different for different sources. After integration, it is possible that the net effect has significant variation over frequency, i.e. the total emitted energy indication for a given source may have substantial frequency dependency with this being different for different sources. Thus, as different sources typically have different directivity patterns, the total emitted energy indication for different sources also typically have different frequency dependencies.

A specific example of a possible approach will be described in the following. Providing an DSR characterizing the diffuse acoustic properties of a space and determining an emitted source energy from directivity, pre-gain and reference distance metadata, allows the corresponding desired reverberation energy to be calculated. For example, this can be determined as:

$$E_{norm} * DSR$$

When the components for calculating the DSR are using the same reference level (e.g. related to the full scale of the signal), the resulting reverberation energy will also be an energy normalized for full-scale samples in the PCM signal, when using $E_{norm}$ as calculated above for the emitted source energy, and therefore corresponds to the energy of an Impulse Response (IR) for the diffuse reverberation that could be applied to the corresponding input signal to provide the correct level of reverberation in the used signal representation.

These energy values can be used to determine configuration parameters of a reverberation algorithm, a downmix coefficient or downmix filter prior to the reverberation algorithm.

There are different ways to generate reverberation. Feedback Delay Network, (FDN)-based algorithms such as the Jot reverberator are suitable low complexity approaches. Alternatively, a noise sequence can be shaped to have appropriate (frequency-dependent) decay and spectral shape. In both examples, a prototypical IR (with at least appropriate T60) can be adjusted such that its (frequency-dependent) level is corrected.

The reverberator algorithms may be adjusted such that they produce impulse responses with unit energy (or the unit initial amplitude of DSR may be in relation to an initial amplitude) or the reverberator algorithm may include its own compensation, e.g. in the coloration filters of a Jot reverberator. Alternatively, the downmix may be modified with a (potentially frequency dependent) adjustment, or the downmix coefficients produced by the coefficient processor 507 may be modified.

The compensation may be determined by generating an impulse response without any such adjustment, but with all other configurations applied (such as appropriate reverberation time (T60) and reflection density (e.g. delay values in FDN) and measuring the energy of that IR.

$$E_{protRev} = \sum_{n=0}^{N_{max}} h_{rev}(n)$$

The compensation may be the inverse of that energy. For inclusion in the downmix coefficients a square-root is typically applied. E.g.:

$$d_x = \sqrt{\frac{E_{norm,x} * DSR}{E_{protRev}}}$$

In many other embodiments, the compensation may be derived from the configuration parameters. For example, when DSR is relative to an initial reverberation amplitude, the first reflection can be derived from its configuration. The correlation filters are energy preserving by definition, and also the coloration filters can be designed to be.

Assuming no net boost or attenuation by the coloration filters, the reverberator may for example result in an initial amplitude ($A_0$) that depends on T60 and the smallest delay value minDelay:

$$A0 = 10^{\frac{-3 * minDelay}{T60 * fs}} * \sqrt{T60}$$

Predicting the reverberation energy may also be done heuristically.

As a general model for diffuse reverberation energy, an exponential function A(t) can be considered:

$$\alpha = \frac{\ln\left(10^{-\frac{60}{20}}\right)}{-T60}$$

$$A(t) = A_0 \cdot e^{-\alpha \cdot (t - t3)}$$

for t≥t3=predelay. With α the decay factor controlled by T60, and $A_0$ the amplitude at pre-delay.

Calculating the cumulative energy of a function like this, it will asymptotically approach some final energy value. The final energy value has an almost perfectly linear relation with T60.

The factor of the linear relation depends on the sparseness of function A (setting every 2nd value to 0 results about half the energy), the initial value $A_0$ (energy scales linearly with $A_0^2$) and the sample rate (scales linearly with changes in fs). The diffuse tail can be modelled reliably with such a function, using T60, reflection density (derived from FDN delays) and sample rate. $A_0$ for the model can be calculated as shown above, to be equal to that of the FDN.

When generating multiple parametric reverbs with broadband T60 values in the range 0.1-2 s, the energy of the IR is close to linear with the model. The scale factor between the actual energy and the exponential equation model averages is determined by the sparseness of the FDN response. This sparseness becomes less towards the end of the IR but has most impact in the beginning. It has been found, from testing the above with multiple configurations of the delay values that a nearly linear relation exists between the model reduction factor and the smallest different between the delays configured in the FDN.

For example, for a certain implementation of a Jot reverberator, this may amount to a scalefactor SF calculated by:

$$SF=7.0208*\mathrm{MinDelayDiff}+214.1928$$

The energy of model is calculated by integrating from t=0 to infinity. This can be done analytically and results in:

$$revModelEnergy = \frac{A_0^2 * fs}{2 * \mathrm{alpha}}$$

Combining the above, we get the following prediction for the reverb energy.

$$revPredEnergy = \frac{A_0^2 * fs}{2 * \mathrm{alpha}} \cdot \frac{1}{0.8776 * MinDelayDiff + 26.7741}$$

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An audio apparatus comprising:

a receiver circuit arranged to receive a plurality of audio signals, and metadata, wherein the plurality of audio signals represent sound sources in an environment, wherein the metadata comprises a diffuse reverberation signal to total signal relationship, directivity data and a signal level indication for each audio signal of the plurality of audio signals, wherein the diffuse reverberation signal to total signal relationship is indicative of a level of diffuse reverberation sound relative to total emitted sound in an environment, wherein the directivity data is indicative of a directivity of sound radiation from the sound source represented by each of the plurality of audio signals;

a circuit arranged to determine a total emitted energy indication and a downmix coefficient for each of the plurality of audio signals, wherein the total emitted energy indication is based on the signal level indication and the directivity data, wherein the downmix coefficient is based on the total emitted energy and the diffuse reverberation signal to total signal relationship;

a downmixer circuit, wherein the downmixer circuit is arranged to generate a downmix signal by combining signal components of each of the plurality of audio signals generated by applying the corresponding downmix coefficient to each of the plurality of audio signals; and a reverberator circuit, wherein the reverberator circuit is arranged to generate a diffuse reverberation signal from the downmix signal, wherein the diffuse reverberation signal is for the environment.

2. The audio apparatus of claim 1, wherein the directivity of sound radiation is frequency dependent, wherein the circuit is arranged to determine a frequency dependent total emitted energy and frequency dependent downmix coefficients.

3. The audio apparatus of claim 1, wherein the diffuse reverberation signal to total signal relationship is frequency dependent, wherein the circuit is arranged to determine frequency dependent downmix coefficients.

4. The audio apparatus of claim 1, wherein the diffuse reverberation signal to total signal relationship comprises a frequency dependent portion and a non-frequency dependent portion, wherein the circuit is arranged to determine the downmix coefficients using the non-frequency dependent portion, wherein the circuit is arranged to adapt the reverberator circuit using the frequency dependent portion part.

5. The audio apparatus of claim 1, wherein the circuit is arranged to determine the total emitted energy indication for a first audio signal of the plurality of audio signals in response to a scaling of the signal level indication for the first audio signal, wherein the scaling is by a value determined by integrating a directivity pattern of the sound source represented by the first audio signal, wherein the directivity pattern is determined based on directivity data.

6. The audio apparatus of claim 1, wherein the signal level indication for a first audio signal of the plurality of audio signals comprises a reference distance, wherein the reference distance indicates a distance from the audio source represented by the first audio signal for a distance reference gain for the first audio signal.

7. The audio apparatus of claim 6, wherein an integration is performed for a the reference distance from the audio source represented by the first audio signal.

8. The audio apparatus of claim 1, wherein the diffuse reverberation signal to total signal relationship is indicative of an energy of diffuse reverberation sound relative to an energy of total emitted sound in the environment.

9. The audio apparatus of claim 1, wherein the diffuse reverberation signal to total signal relationship is indicative of an initial amplitude of diffuse sound relative to an energy of total emitted sound in the environment.

10. The audio apparatus of claim 1, wherein the downmix coefficient determined for a first audio signal of the plurality of audio signals is independent on a position of a first audio source represented by the first audio signal.

11. The audio apparatus of claim 1, wherein the downmix coefficient determined for a first audio signal of the plurality of audio signals is independent of a position of a listener.

12. The audio apparatus of claim 1, wherein the signal level indication for a first audio signal of the plurality of audio signals comprises a gain indication for the first audio signal, wherein the gain indication is indicative of a gain to apply to the first audio signal when rendering sound from a first audio source represented by the first audio signal, wherein the circuit is arranged to determine the downmix coefficient for the first audio signal in response to the gain indication.

13. The audio apparatus of claim 1, further comprising a direct rendering circuit, wherein the direct rendering circuit is arranged to generate a direct path audio signal for a first audio signal of the plurality of audio signals in response to the signal level indication and the directivity data of the first audio signal.

14. The audio apparatus of claim 1, wherein the metadata further comprises a delay indication and the diffuse reverberation signal to total signal relationship, wherein the diffuse reverberation signal to total signal relationship is indicative of an energy of a delayed diffuse reverberation sound relative to an energy of total emitted sound in the environment, wherein the delayed diffuse reverberation sound is the diffuse reverberation sound after delay, wherein the delay is substantially the same as the delay indication.

15. A method comprising:

receiving a plurality of audio signals, wherein the plurality of audio signals represent sound sources in the environment;

receiving metadata, wherein the metadata comprises a diffuse reverberation signal to total signal relationship, directivity data and a signal level indication for each audio signal of the plurality of audio signals, wherein the diffuse reverberation signal to total signal relationship is indicative of a level of diffuse reverberation sound relative to total emitted sound in the environment, wherein the directivity data is indicative of directivity of sound radiation from the sound source represented by each of the plurality of audio signals;

determining a total emitted energy indication based on the signal level indication and the directivity data for each of the plurality of audio signals;

determining a downmix coefficient based on the total emitted energy and the diffuse reverberation signal to total signal relationship for each of the plurality of audio signals;

generating a downmix signal by combining signal components of each of the plurality of audio signals generated by applying the corresponding downmix coefficient to each of the plurality of audio signals; and generating the diffuse reverberation signal for the environment from the downmix signal.

16. A computer program product stored on a non-transitory medium, wherein the computer program when executed on a processor performs the method as claimed in claim 15.

17. The method of claim 15, further comprising determining a frequency dependent total emitted energy and frequency dependent downmix coefficients, wherein the directivity of sound radiation is frequency dependent.

18. The method of claim 15, further comprising determining frequency dependent downmix coefficients, wherein the diffuse reverberation signal to total signal relationship is frequency dependent.

19. The method of claim 15, further comprising:

determining the downmix coefficients using a non-frequency dependent portion of the diffuse reverberation signal;

adapting a frequency dependent portion of a frequency dependent portion of the diffuse reverberation signal; and determining the downmix coefficients using the non-frequency dependent portion.

20. The method of claim 15, further comprising, determining the total emitted energy indication for a first audio signal of the plurality of audio signals in response to a scaling of the signal level indication for the first audio signal, wherein the scaling is by a value determined by integrating a directivity pattern of the sound source represented by the first audio signal, wherein the directivity pattern is determined based on directivity data.

21. The method of claim 15, wherein the metadata further comprises a delay indication and the diffuse reverberation signal to total signal relationship, wherein the diffuse reverberation signal to total signal relationship is indicative of an energy of a delayed diffuse reverberation sound relative to an energy of total emitted sound in the environment, wherein the delayed diffuse reverberation sound is the diffuse reverberation sound after delay, wherein the delay is substantially the same as the delay indication.

* * * * *